(12) United States Patent
Obrejanu

(10) Patent No.: US 10,443,369 B2
(45) Date of Patent: Oct. 15, 2019

(54) GAS SEPARATORS AND RELATED METHODS

(71) Applicant: Premium Artificial Lift Systems Ltd., Calgary (CA)

(72) Inventor: Marcel Obrejanu, Calgary (CA)

(73) Assignee: PREMIUM ARTIFICIAL LIFT SYSTEMS LTD., Calgary, Alberta (CA)

( * ) Notice: Subject to any disclaimer, the term of this patent is extended or adjusted under 35 U.S.C. 154(b) by 671 days.

(21) Appl. No.: 15/076,746

(22) Filed: Mar. 22, 2016

(65) Prior Publication Data

US 2016/0281486 A1    Sep. 29, 2016

(30) Foreign Application Priority Data

Mar. 23, 2015    (CA) ...................................... 2885571

(51) Int. Cl.
| | | |
|---|---|---|
| *B01D 19/00* | (2006.01) | |
| *E21B 43/38* | (2006.01) | |
| *B01D 21/24* | (2006.01) | |
| *E21B 43/12* | (2006.01) | |

(52) U.S. Cl.
CPC .......... *E21B 43/38* (2013.01); *B01D 19/0042* (2013.01); *B01D 21/2494* (2013.01); *E21B 43/121* (2013.01)

(58) Field of Classification Search
None
See application file for complete search history.

(56) References Cited

U.S. PATENT DOCUMENTS

| | | | |
|---|---|---|---|
| 5,588,486 A | 12/1996 | Heinrichs | |
| 7,270,178 B2 * | 9/2007 | Selph | E21B 43/128 |
| | | | 166/105.5 |
| 8,276,673 B2 * | 10/2012 | Zupanick | E21B 43/123 |
| | | | 166/316 |
| 8,919,432 B1 * | 12/2014 | Tetzlaff | F04D 29/4293 |
| | | | 166/105.5 |

(Continued)

OTHER PUBLICATIONS

Examiner's Report dated Jul. 8, 2015 with respect to Canadian Patent Application 2,885,571 (4 pages).

(Continued)

*Primary Examiner* — Amber R Orlando
*Assistant Examiner* — Phillip Y Shao
(74) *Attorney, Agent, or Firm* — Westman, Champlin & Koehler, P.A.

(57) ABSTRACT

A weighted intake member for a gas separator is mountable on a flow tube and defines an intake port. The weighted intake member includes a weight proximate the intake port. In a deviated well, gravity acting on the weight biases the weighted intake member toward an orientation in which the intake port faces a low side of the gas separation chamber of the gas separator. One end of the gas separator is for connection to a pump in a production well, and an opposite end of the gas separator body could carry a plug or a sub. The sub could be coupled to a section of production tubing or to a sump, and a plug or a check valve could be coupled to the sump. A sump could be provided in a gas separator with or without a weighted intake member. Related methods are also disclosed.

22 Claims, 10 Drawing Sheets

(56) References Cited

U.S. PATENT DOCUMENTS

2015/0204169 A1* 7/2015 Coates .................. E21B 43/128
166/369

OTHER PUBLICATIONS

Patent Office letter issued Jul. 23, 2015 withdrawing Examiner's Report dated Jul. 8, 2015, with respect to Canadian Patent Application 2,885,571 (1 page).
Examiner's Report dated Jul. 23, 2015 with respect to Canadian Patent Application 2,885,571 (4 pages).
Examiner's Report dated Nov. 30, 2015 with respect to Canadian Patent Application 2,885,571 (3 pages).

* cited by examiner

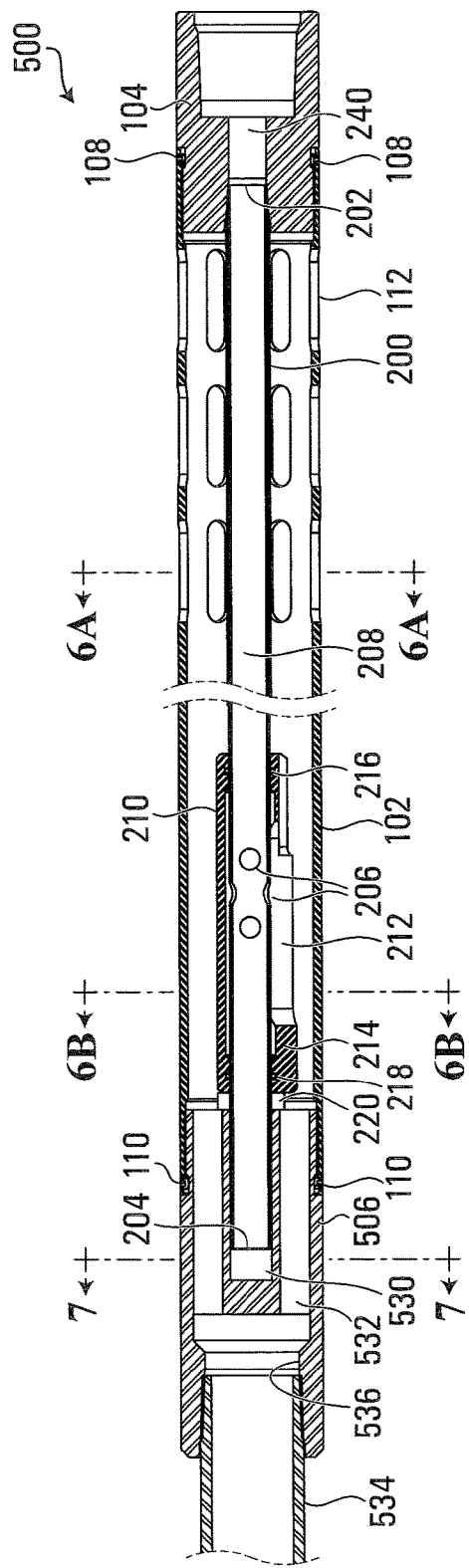
FIG. 5
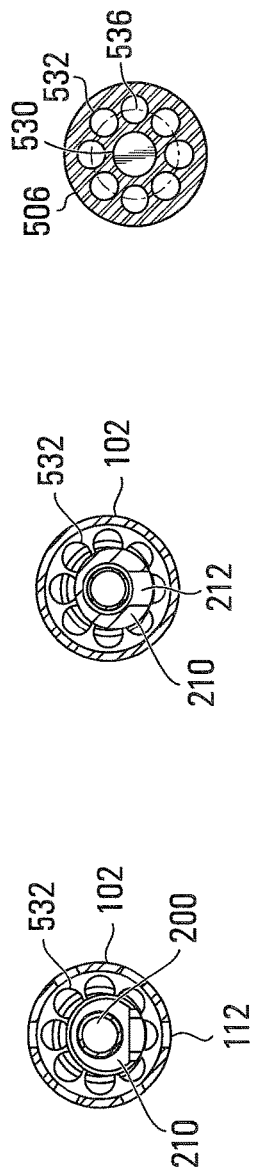
FIG. 6A
FIG. 6B
FIG. 7

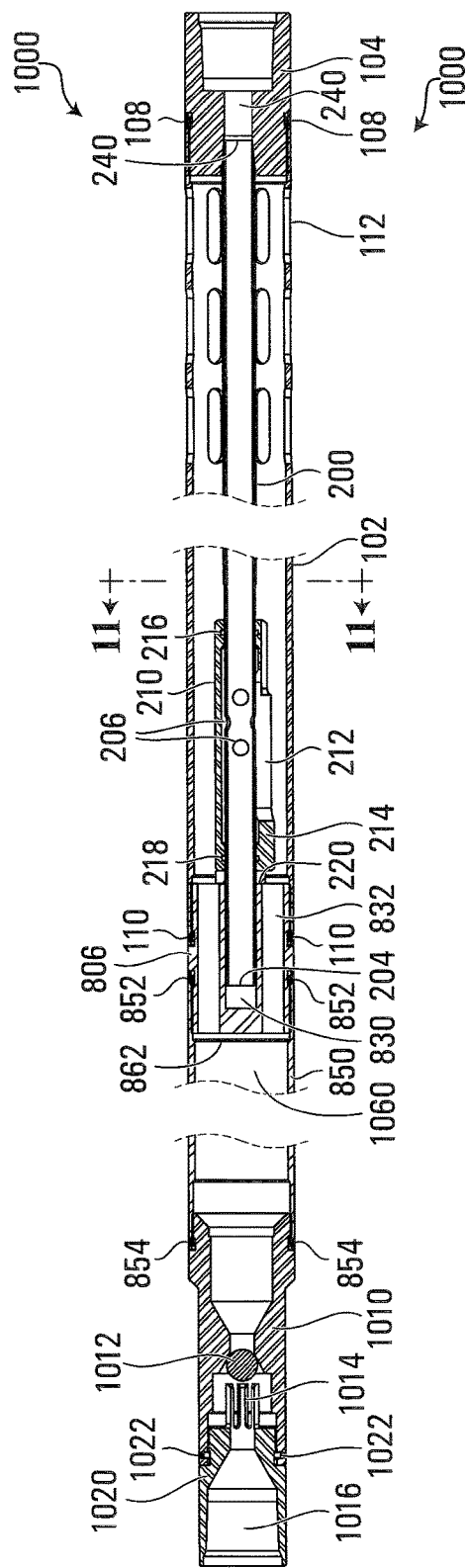
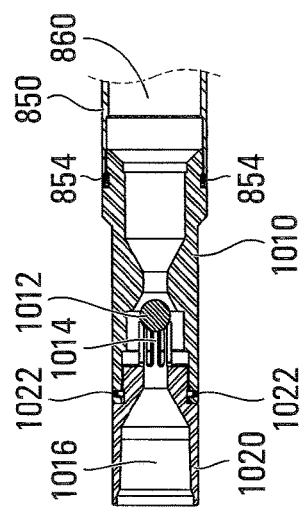
FIG. 10
FIG. 11

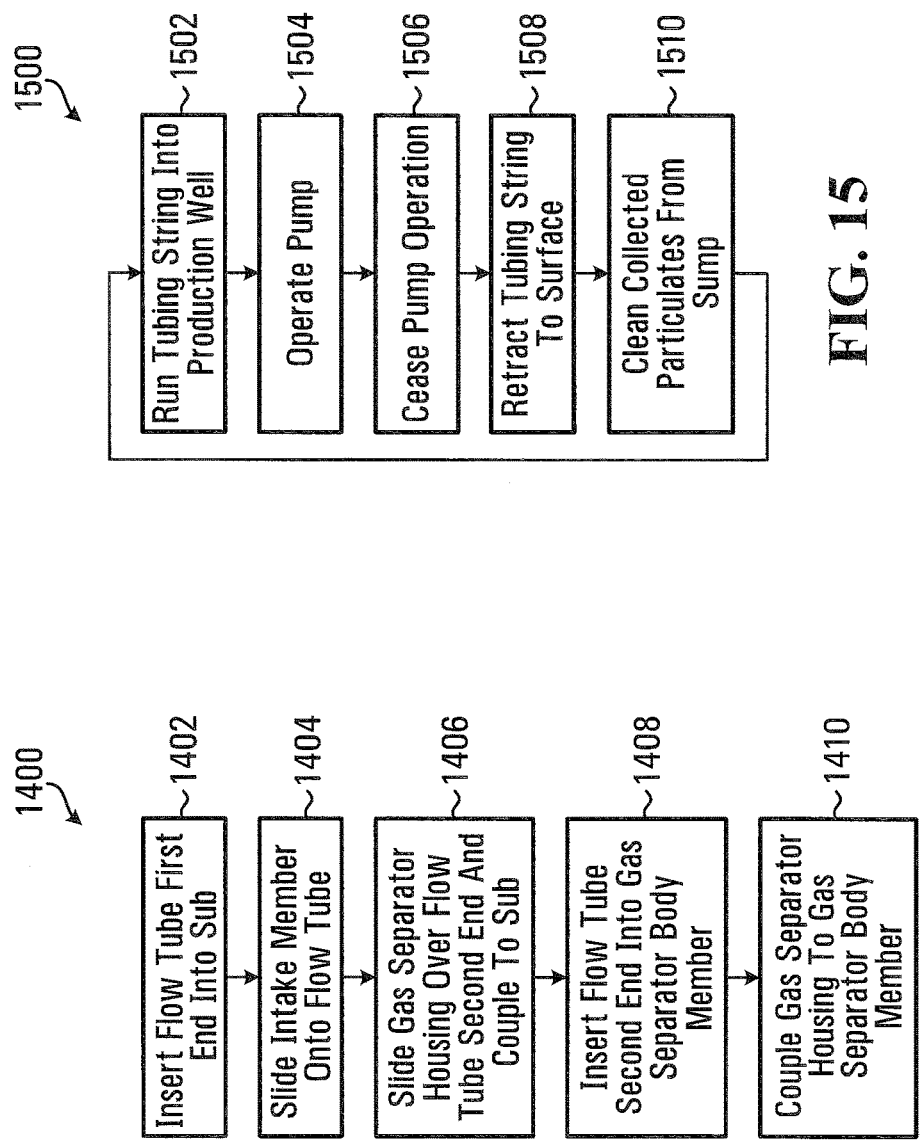

GAS SEPARATORS AND RELATED METHODS

CROSS-REFERENCE TO RELATED APPLICATION

The present application claims priority to Canadian patent application No. 2,885,571, entitled "GAS SEPARATORS AND RELATED METHODS" and filed on Mar. 23, 2015, the entire contents of which are incorporated herein by reference.

FIELD

The present disclosure relates generally to downhole equipment for production wells and, in particular, to gas separators.

BACKGROUND

Downhole gas separators are used to separate free gas that is flowing from a reservoir into a wellbore together with produced liquids. Downhole pumps are typically "volumetric" pumps, and any free gas that is allowed into the pumps reduces the efficiency of these pumps and/or could damage the pumps.

There are different configurations of gas separators that use the same principles or theory for gas separation and follow the same cycles to allow gas to separate out from liquids. For example, during an up-stroke of a pump, liquids are drawn through the gas separator and pumped to the surface, whereas during a down-stroke, liquids with free gas are at rest inside the gas separator and the free gas can separate out of the liquids before the liquids are drawn into the pump.

SUMMARY

According to an aspect of the present disclosure, a gas separator includes: a gas separator body having a first end to couple the gas separator to a pump in a production well, a second end, a wall between the first end and the second end, and an opening proximate the first end to allow passage of fluid between the production well and an interior of the gas separator body; a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with an interior of the flow tube; and a weighted intake member sealed against and rotatably mounted on the flow tube to enable the weighted intake member to be rotated around the flow tube. The weighted intake member defines an intake port in fluid communication with the interior of the gas separator body and the flow tube opening, and includes a weight proximate the intake port.

In an embodiment, the gas separator body includes: a sub at the first end of the gas separator body to couple the gas separator to the pump; a housing having a first end coupled to the sub, a second end, and a wall between the first end of the housing and the second end of the housing, the wall of the housing having the opening formed therein to allow fluid passage between the production well and the interior of the gas separator body; and a body member at the second end of the gas separator body, coupled to the second end of the housing.

The gas separator body may include a plug at the second end of the gas separator body. The plug could include a chamber in which the second end of the flow tube is received and sealed from the interior of the gas separator body.

The gas separator body may include a sub, at the second end of the gas separator body, in fluid communication with the interior and the exterior of the gas separator body, in which case the sub includes a chamber in which the second end of the flow tube is received and sealed from the interior of the gas separator body.

In an embodiment, the gas separator also includes: a sump that has a first end to be coupled to the gas separator body, and a second end; and a plug at the second end of the sump. The gas separator body may then include a sub, at the second end of the gas separator body and in fluid communication with the interior of the gas separator body, coupling the first end of the sump to the gas separator body and including a chamber in which the second end of the flow tube is received and sealed from the interior of the gas separator body.

With the gas separator body including such a sub and a sump having a first end coupled to the gas separator body by the sub and a second end, a check valve could be coupled to the second end of the sump instead of a plug.

The weighted intake member could be further slidably mounted on the flow tube to enable the weighted intake member to be moved along the flow tube.

The weight of the weighted intake member could include an increased thickness of material of the weighted intake member in an area of the weighted intake member proximate the intake port, relative to a material thickness of a different area of the weighted intake member.

Such a gas separator could be implemented in a production well completion system. The production well completion system could also include a tubing string coupled to surface equipment and downhole equipment coupled to the tubing string. The downhole equipment could include a pump coupled to the gas separator at the first end of the gas separator body.

According to another aspect, a gas separator includes: a gas separator body having a first end to couple the gas separator to a pump in a production well, a second end, a wall between the first end and the second end, and an opening proximate the first end to allow passage of fluid between the production well and an interior of the gas separator body; a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with the interior of the gas separator body; and a sump coupled to the second end of the gas separator body.

In an embodiment, the sump has a first end coupled to the second end of the gas separator body, and a second end. The gas separator could include a plug or a check valve coupled to the second end of the sump.

The gas separator body could include a sub, at the second end of the gas separator body and in fluid communication with the interior of the gas separator body, coupling the sump to the gas separator body, and the sub could include a chamber in which the second end of the flow tube is received and sealed from the interior of the gas separator body.

The gas separator could include: a sub at the first end of the gas separator body to couple the gas separator to the pump; a housing having a first end coupled to the sub, a second end, and a wall between the first end of the housing and the second end of the housing, the wall of the housing having the opening formed therein to allow fluid passage between the production well and the interior of the gas separator body; and a body member at the second end of the gas separator body, coupled to the second end of the housing.

As noted above, a gas separator could be implemented in a production well completion system that also includes a tubing string coupled to surface equipment and downhole equipment coupled to the tubing string, with the downhole equipment including a pump coupled to the gas separator at the first end of the gas separator body.

A weighted intake member for a gas separator, according to another aspect, includes: an intake member body having formed therein: aligned end bores to receive a flow tube for a gas separator, an intake member interior chamber; and an intake port opening into the intake member interior chamber. The weighted intake member also includes a weight, carried by the intake member body, proximate the intake port.

A method is also provided, and includes: inserting a first open end of a flow tube for a gas separator into a sub, the flow tube further having a second open end and a wall between the first end and the second end, the wall having an opening defined therein proximate the second end; sliding a weighted intake member onto the flow tube to rotatably mount the weighted intake member to the flow tube, the weighted intake member defining an intake member interior chamber sealed against the flow tube and an intake port opening into the intake member interior chamber and including a weight proximate the intake port; sliding a gas separator housing over the second end of the flow tube and the weighted intake member and toward the sub; coupling the gas separator housing to the sub; inserting the second end of the flow tube into a cavity in a gas separator body member to seal the second end of the flow tube; and coupling the gas separator housing to the gas separator body member.

The method could also involve coupling a sump to the gas separator body member.

In an embodiment, the method also includes coupling a check valve to the sump.

Another method includes: running a tubing string with attached downhole equipment into a production well, the downhole equipment including a pump and a gas separator coupled to the pump, the gas separator including a sump to collect particulates that settle out of wellbore fluid in a chamber of the gas separator; operating the pump to draw the wellbore fluid through the gas separator and pump the wellbore fluid into the tubing string; ceasing operation of the pump; retracting the tubing string and the downhole equipment to a surface of the production well; cleaning collected particulates from the sump; running the tubing string back into the production well.

According to a further aspect, a method includes: inserting a first open end of a flow tube for a gas separator into a sub, the flow tube also having a second open end and a wall between the first end and the second end, the wall having an opening defined therein proximate the second end; sliding a gas separator housing over the second end of the flow tube and toward the sub; coupling the gas separator housing to the sub; inserting the second end of the flow tube into a cavity in a gas separator body member to seal the second end of the flow tube; coupling the gas separator housing to the gas separator body member; and coupling a sump to the gas separator body member.

The method may also include coupling a check valve to the sump.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 5 is a cross-section view of another example gas separator.

FIG. 6A is a cross-section view of the example gas separator of FIG. 5, along line 6A-6A in FIG. 5.

FIG. 6B is a cross-section view of the example gas separator of FIG. 5, along line 6B-6B in FIG. 5.

FIG. 7 is a cross-section view of the example gas separator of FIG. 5, along line 7-7 in FIG. 5.

FIG. 10 is a cross-section view of yet another example gas separator.

FIG. 11 is a cross-section view of part of the example gas separator of FIG. 10 with a check valve in an open position.

FIG. 14 is a flow diagram of an example method.

FIG. 15 is a flow diagram of another example method.

DETAILED DESCRIPTION

As noted above, there are different configurations of gas separators that use the same principles or theory for gas separation. Such gas separators work properly in the range of about 0 to 45 degrees of inclination from vertical, but might not be suitable for use beyond this range of inclinations. In some applications such as in more highly deviated wells, for example, it could be useful for a gas separator to be operational beyond 45 degrees of inclination from vertical.

Figure 1:
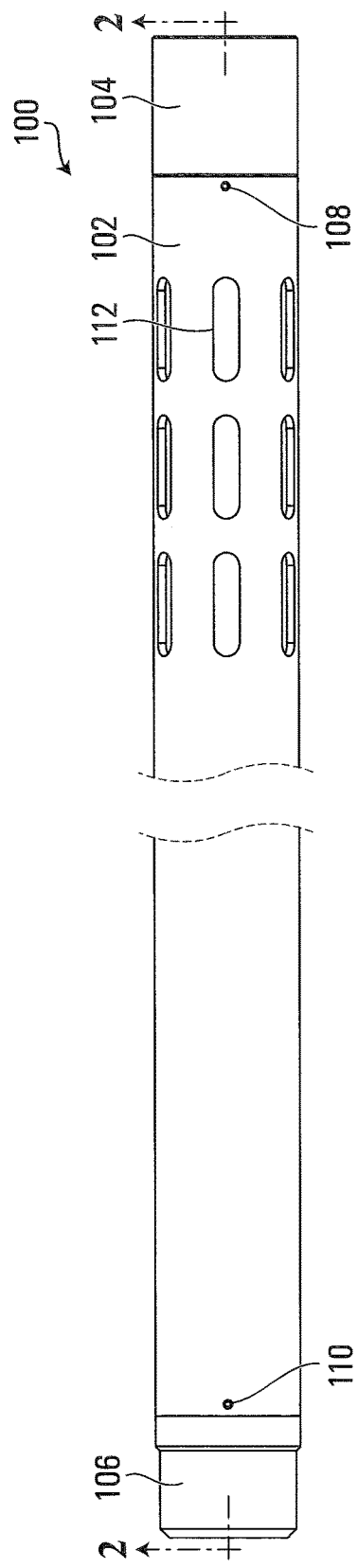
FIG. 1 illustrates an example gas separator.

FIG. 1 illustrates an example gas separator 100, in which a housing 102, a sub 104, and a body member in the form of a plug 106 define a gas separator body. The gas separator body has a first end, where the sub 104 is located, to couple the gas separator to a pump in a production well, a second end, where the plug 106 is located, and a wall defined by the housing 102 between the first end and the second end. The gas separator body has an opening 112, proximate its first end, to allow passage of fluid between the production well and an interior of the gas separator body. In the gas separator 100, there are multiple openings 112.

At the first end of the gas separator body, the sub 104 is coupled to a first end of the housing 102. The sub 104 is provided to couple the gas separator 100 to a pump in a production well, such as through a section of tubing (not shown). The sub 104 and the housing 102 could be coupled together by a threaded connection and held in place by one or more set screws 108. This type of connection between the housing 102 and the sub 104 is intended to be a non-limiting illustrative example, and other types of connections are possible.

The housing 102 is cylindrical in the example shown, and has a first end coupled to the sub 104, a second end coupled to the plug 106, and a wall between the first end and the second end. The wall of the housing 102 has the gas separator body openings 112 formed therein, as shown, in this example. Multiple openings 112 could be provided in any shape or pattern or with any spacing that permits a desired level of inflow of liquids into the interior of the gas separator body. Opening shape(s), pattern(s), and/or spacing(s) of the openings 112 could be determined based on reservoir liquid properties, desired inflow, and desired structural integrity of the housing 102.

At the second end of the gas separator body, the plug 106 is coupled to a second end of the housing 102. The plug 106 and the housing 102 could be coupled together by a threaded connection and held in place by one or more set screws 110, and as noted above this type of connection is intended to be a non-limiting illustrative example. The plug 106 seals the interior of the gas separator body from the exterior of the gas separator body.

At least the housing 102 and the top sub 104 are expected to be made of metal such as steel or stainless steel in most embodiments, and one or more seals such as rubber O-rings could be provided between these parts. The plug 106 could also be made of metal, or from some other material such as polymeric materials. One or more seals could also or instead be provided between the housing 102 and the plug 106.

It should be appreciated that in other embodiments, a gas separator body could be formed using fewer parts than those shown in FIG. 1. For example, the sub 104 or the plug 106 could be integrated with the housing 102 instead of being implemented as separate parts which are connected together as in the example gas separator 100.

Figure 2:
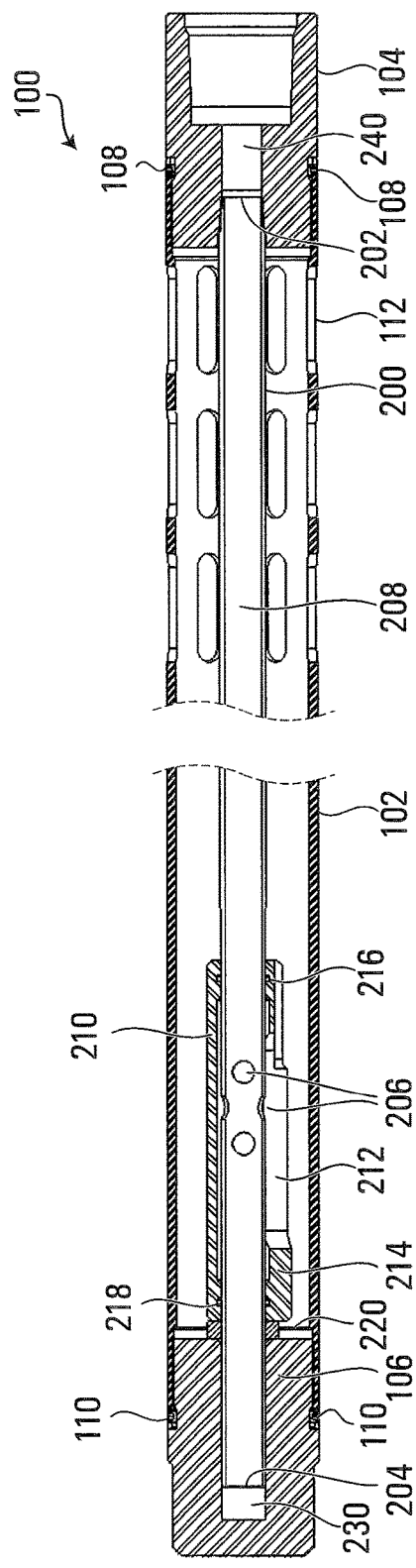
FIG. 2 is a cross-section view of the example gas separator, along line 2-2 in FIG. 1.

Further details of the example gas separator 100 are shown in FIG. 2, which is a cross-section view of the example gas separator, along line 2-2 in FIG. 1. Internal structures within the interior of the gas separator body are visible in FIG. 2.

A flow tube 200 has a first end 202 in fluid communication with an exterior of the gas separator body through the first end of the gas separator body. In the example gas separator 100, this fluid communication is through a channel 240 in the sub 104. The flow tube 200 also has a second end 204, which is sealed from the interior of the gas separator body proximate the second end of the gas separator body. The plug 106 has a chamber 230 in which the second end 204 of the flow tube 200 is received and sealed from the interior of the gas separator body. One or more seals (not shown) could be provided between the flow tube 200 and the plug 106.

The flow tube 200 also has an opening 206 defined therein, proximate its second end 204, in fluid communication with the interior of the gas separator body. There are multiple flow tube openings 206 in the example gas separator 100, and thus a gas separator flow tube could include one or more openings. The flow tube openings 206, like the openings 112 in the gas separator body, could be provided in any shape or pattern and/or with any spacing that permits a desired level of inflow of liquids into the interior 208 of the flow tube 200.

A weighted intake member 210 is sealed against the flow tube 200 by O-ring seals 216, 218 in the example shown, and is rotatably mounted on the flow tube. The weighted intake member 210 could be mounted on the flow tube 200 by sliding the weighted intake member onto the flow tube or sliding the flow tube through the weighted intake member during assembly of the gas separator 100. The weighted intake member 210 is rotatable around the flow tube 200 and defines an intake member interior chamber, between the weighted intake member and the flow tube, and an intake port or slot 212 opening into the intake member interior chamber. The intake port 212 is in fluid communication with the interior of the gas separator body and the flow tube opening(s) 206.

The weighted intake member 210 also includes a weight 214 proximate the intake port 212. The weight 214 could be in the form of an increased thickness of material in an area of the weighted intake member 210 proximate the intake port 212, relative to a material thickness of a different area of the weighted intake member. This results in asymmetry of the weighted intake member 210 about its interior cavity, or about the flow tube 200 when the weighted intake member is mounted on the flow tube. The weight 214 could also or instead include a separate weight or different material that is integrated with or otherwise carried by the weighted intake member 210 near the intake port 212.

A washer 220 may be provided in some embodiments to facilitate rotation of the weighted intake member 210 relative to the plug 106. If for some reason there happened to be relatively high friction between the weighted intake member 210 and the plug 106, the washer 220 between them could give the weighted intake member 210 a better chance to turn to the correct position with the intake port 212 toward a lowest point of the separation chamber inside the gas separator 100. The washer 220 could be made of the same material as the plug 106 and/or the weighted intake member 210, in which case the washer may reduce friction by providing a smaller contact area with the weighted intake member. In other embodiments the washer 220 is fabricated from a different material that has a lower coefficient of friction than at least the plug 106. A reduction in friction could also or instead be provided by a coating on one or both of the plug 106 and the weighted intake member 210. The washer 220 or any other friction reduction element need not necessarily be provided in every embodiment.

During operation of a pump to which the example gas separator 100 is connected, liquids which may be carrying free gas enter into the gas separator 100 through the openings 112. The liquids flow from the openings 112 toward the weighted intake member 210, through the intake port 212 and into the flow tube 200 through the openings 206.

According to current theory of downhole free gas separation, a liquid flow of less than 6 inches per second provides time for free gas to separate out and avoids forcing the free gas with the flow of liquids into the pump suction. This method of gas separation is a "two cycle" separation system, which follows the movement of a downhole piston pump, for example. On the up-stroke of the pump, a mixture of liquids and gas flows from the formation into the separation chamber inside the "barrel" or housing 102 of the gas separator 100. The separation chamber in the example gas separator 100 is the space between the housing 102 and the flow tube 200, bounded by the sub 104 and the plug 106. On the pump down-stroke, also referred to as the quiet time, bubbles of free gas can travel upwards and exit the separation chamber, through entrance/exit slots (openings 112) in the housing 102.

The flow of liquids is through the slots or ports (openings 112) in the housing 102, down in-between the housing and the flow tube 200, then through the intake port 212 in the weighted intake member 210, into the ports or holes (openings 206) in the flow tube, and up the flow tube into the pump suction. During the down-stroke of the pump, the free gas can travel upwards in-between the housing 102 and the flow tube 200, and exit in the annular space through the openings 112 in the housing 102. Therefore, during the next cycle, on the up-stroke of the pump only liquid that has been at rest in the separation chamber during the preceding down-stroke quiet time, for free gas to separate out, is drawn into the flow tube 200 by the pump.

Some gas separators rely on pump suction to draw liquids into the separation chamber. In the example gas separator 100, the opening(s) 112 in the gas separator body could allow liquids to more freely flow into the separation chamber inside the gas separator without having to be actively drawn into the separation chamber by pump suction.

The weight 214 of the intake member 210 serves to orient the intake member on the flow tube 200 such that the openings 206 are within the intake member interior chamber, and the intake port 212 is toward the bottom of the separation chamber. This effect of the weight 214 is perhaps most clearly shown in FIGS. 3 and 4, which are cross-section views of the example gas separator at different orientations in a production well.

Figure 3:
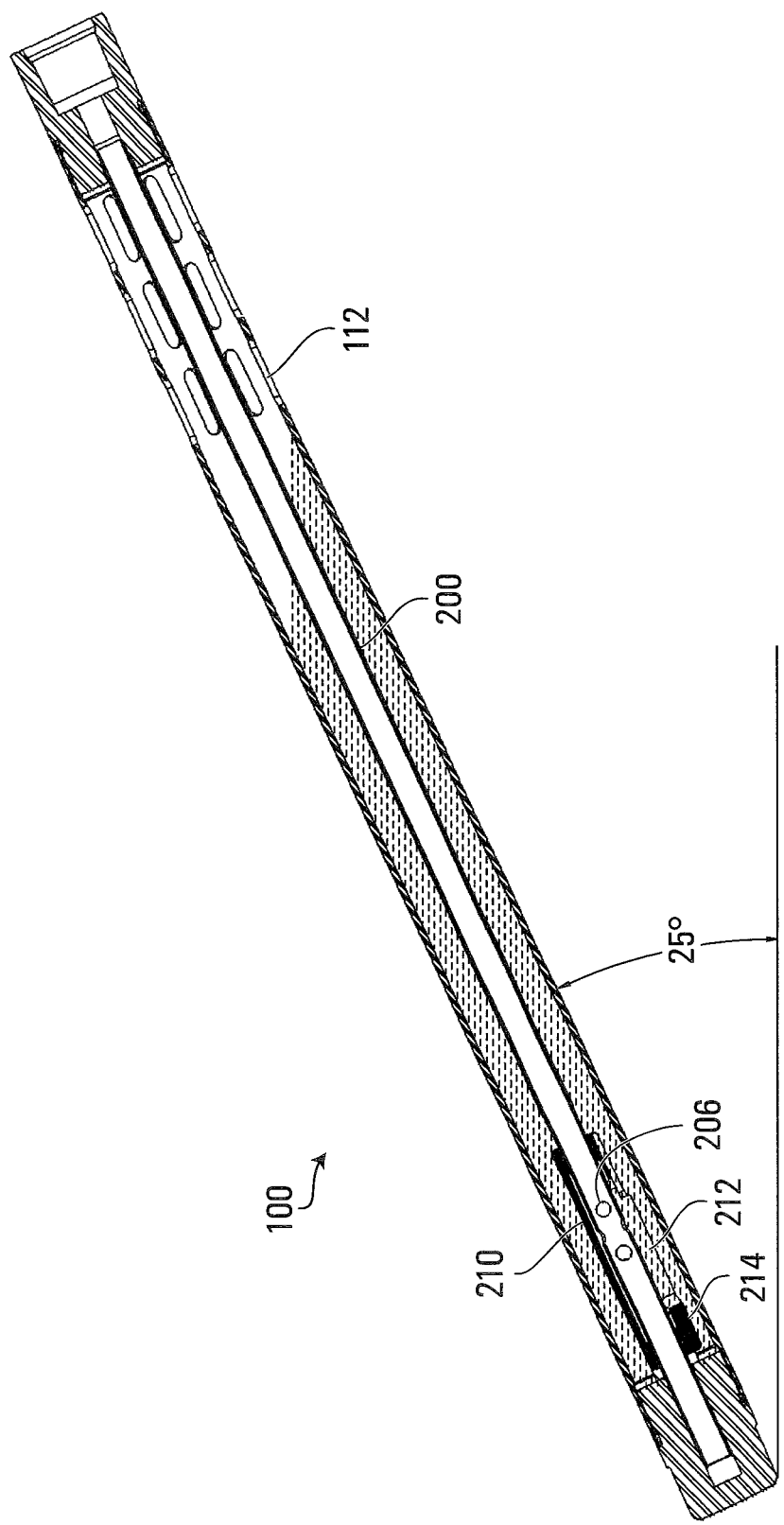
FIGS. 3 and 4 are cross-section views of the example gas separator at different orientations in a production well.

In FIG. 3, the example gas separator 100 is at an inclination of 25 degrees from horizontal, or 65 degrees from vertical. Gravity acts on the weight 214 to orient the weight toward its lowest possible point, which in turn orients the intake port 212 toward a bottom of the separation chamber. In this orientation, suction is from near the bottom of the separation chamber, which could help to avoid or reduce sucking/forcing/coning gas into the pump suction, from a flow tube opening 206 that is oriented upward toward the surface of liquid in the separation chamber.

Figure 4:
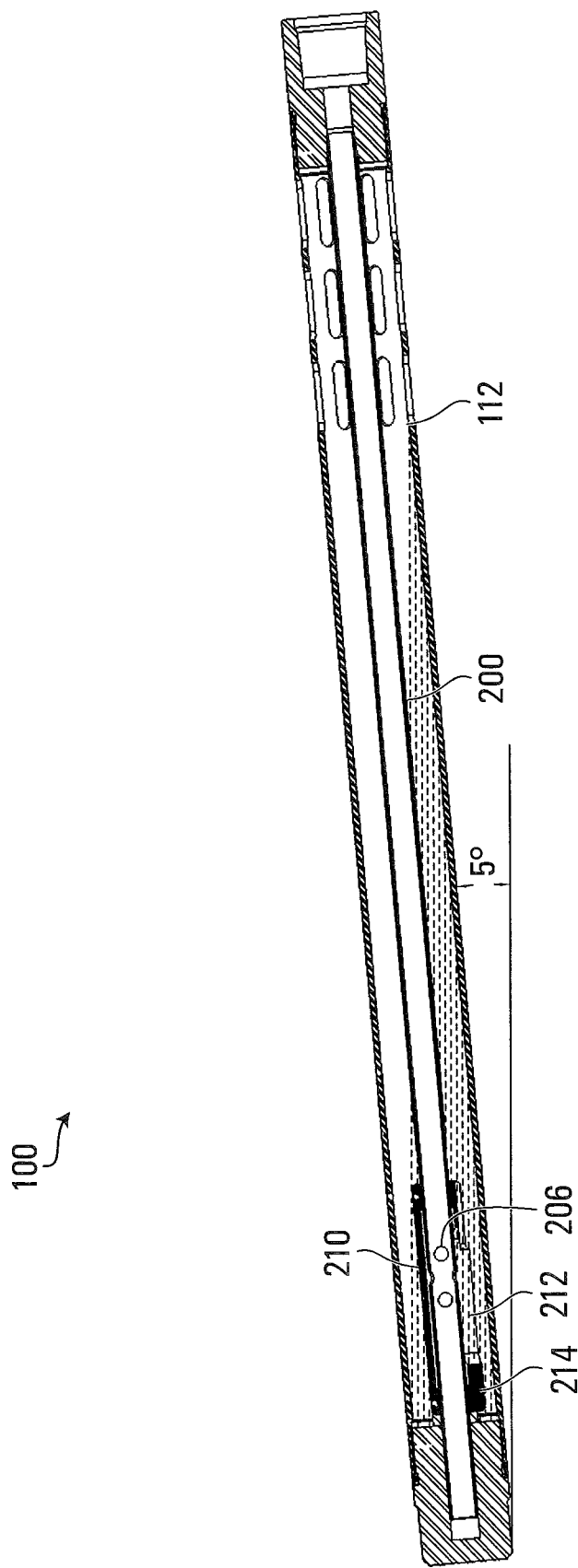

FIG. 4 similarly shows the example gas separator 100, but at a greater inclination of 85 degrees from vertical (5 degrees from horizontal). Again, suction is from near the bottom of the separation chamber. In both FIG. 3 and FIG. 4, the weighted intake member 210 remains submerged for liquid levels that are at least as high as a lowest opening 112 in the gas separator 100.

With the weighted intake member 210 being rotatably mounted on the flow tube 200, the weighted intake member is rotatable to draw liquids into the flow tube from toward a lowest point of the separation chamber. This is an effect of gravity acting on the weight 214. The weighted intake member 210 could be further slidably mounted on the flow tube 200, to enable the weighted intake member to be moved along at least a portion of the flow tube. Gravity acting on the weight 214 would bias the weighted intake member 210 toward a lowest point on the flow tube 200 at which the weighted intake member comes into contact with the washer 220 when the gas separator 100 is in use. During use, the plug end of the gas separator 100 is lower than the sub end of the gas separator, and thus the end of the flow tube 200 near the openings 206 is lower than the other end of the flow tube. The weighted intake member 210 would then be urged by gravity toward its operating position around the flow tube openings 206.

The weighted intake member 210 need not be slidable on the flow tube 200 in all embodiments, as its longitudinal position along the flow tube could be otherwise fixed or limited so that it remains at a desired position or within a certain maximum distance from the washer 220. For example, the flow tube 200 could be machined to a smaller outer diameter in the vicinity of the openings 206 than a remainder of the flow tube to limit the extent to which the weighted intake member 210 is slidable along the flow tube. Even in embodiments in which its longitudinal position on the flow tube 200 is fixed or limited, the weighted intake member 210 could still be rotatable to enable the intake port 212 to be oriented toward a bottom of the separation chamber.

In the embodiments described above with reference to FIGS. 1 to 4, the end of the gas separator body that is not to be connected to a pump is sealed by the plug 106. In FIG. 5, which is a cross-section view of another example gas separator 500, a further sub 506 is provided at the second end of the gas separator body and is coupled to the housing 102. As noted above for other couplings or connections, a threaded connection secured by set screws 110 could be used between the housing 102 and the sub 506, although other types of connections could be used in other embodiments. The sub 506 could be made of metal and/or other material, and in an embodiment the subs 104, 506 are made of the same material. The subs 104, 506 could each be machined out of respective solid pieces of material, for example.

Like the plug 106 in FIG. 2, the sub 506 in FIG. 5 has a chamber 530 in which the second end 204 of the flow tube 200 is received and sealed from the interior of the gas separator body. One or more seals (not shown) could also or instead be provided. However, the sub 506 is in fluid communication with the interior and the exterior of the gas separator body, through channels 532, which in an embodiment are flow ports drilled from one end of the sub 506 until they connect with a larger bore at the other end. In FIG. 5, 536 designates an end of the larger bore at an area where the bore meets the channels 532.

FIGS. 6A, 6B, and 7 are cross-section views of the example gas separator 500 of FIG. 5, along lines 6A-6A, 6B-6B, and 7-7 in FIG. 5, respectively. These drawings show an example of how multiple channels 532 could be arranged around the chamber 530 and thus the flow tube 200 to provide for fluid communication between the separation chamber inside the gas separator body and the exterior of the gas separator body through the sub 506. In the example shown, there are 8 channels 532 equally at 45 degree positions around the chamber 530. Other arrangements of one or more channels, which could be of similar shapes and/or spacings or different shapes and/or spacings than shown, are also possible.

FIGS. 6A and 6B also illustrate an embodiment of the weighted intake member 210 which is asymmetric or eccentric about the flow tube 200. In such an embodiment the weight 214 of the weighted intake member 210 could be in the form of more material on the intake port side of the weighted intake member than on the opposite side of the weighted intake member.

Turning again to FIG. 5, a tubing section 534 is coupled to the sub 506. Like other couplings or connections disclosed herein, the tubing section 534 could be coupled to the sub 506 by a threaded connection and possibly one or more set screws, or another type of connection. For instance, in another embodiment, the sub 506 could be substituted with sub that is designed for a pin connection with a tubing section.

On a pump down-stroke, free gas that is carried by liquids separates out in the separation chamber. Liquids could also be carrying particulates such as sand, which may settle toward the bottom of the separation chamber during the pump quiet time. The sub 506 in the example gas separator 500 allows sand and/or other settled particulates to be dumped from the gas separator into the tubing section 534. The tubing section 534 could provide a cellar in which particulates can collect, or a conduit through which particulates could be dumped into a different part of a well. The length of the tubing section 534 could be determined based on how far from the gas separator 500 settled particulates are to be dumped, or a volume of space that is to be provided for accumulation of settled particulates in the tubing section 534, for example. In some embodiments, the sub 506 could be used without a tubing section 534.

The example gas separator 100 provides some room for settled particulates to accumulate in the separation chamber, as will be evident from FIG. 2. The sub 506 in the example gas separator 500 in FIG. 5 allows settled particulates to exit the separation chamber into the well, either directly or through one or more tubing sections 534. Another possible option for dealing with particulates that settle during gas separation is to provide a sump with a collection chamber for holding settled particulates.

Figure 8:
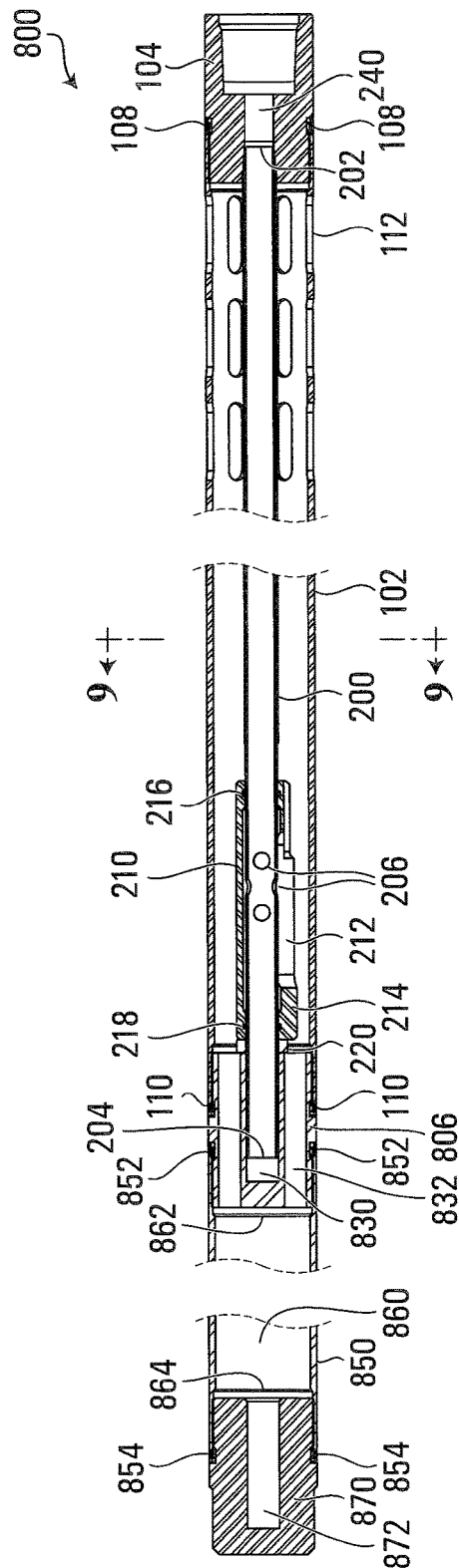
FIG. 8 is a cross-section view of a further example gas separator.

FIG. 8 is a cross-section view of a further example gas separator 800, which includes a sump. The body of the example gas separator 800 is substantially similar in structure to other embodiments described above, but includes a further sub 806, at the second end of the gas separator body and coupled to the housing 102, to couple the sump to the gas separator body. As noted above for other couplings or connections, a threaded connection secured by set screws 110 could be used between the housing 102 and the sub 806, and other types of connections could be used in other embodiments. The sub 806 could be made of metal and/or other material, and in an embodiment the subs 104, 806 are made of the same material. In an embodiment, the sub 806 has a chamber 830 and channel 832 structure similar to the chamber/channel structure of the sub 506 (FIG. 5), but includes exterior threads at both ends instead of an extension with a larger bore or tubing connector at one end as in the sub 506. Other types of connections are also possible.

Figure 9:
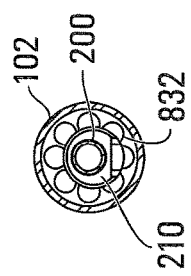
FIG. 9 is a cross-section view of the example gas separator of FIG. 8, along line 9-9 in FIG. 8.
Figure 12B:
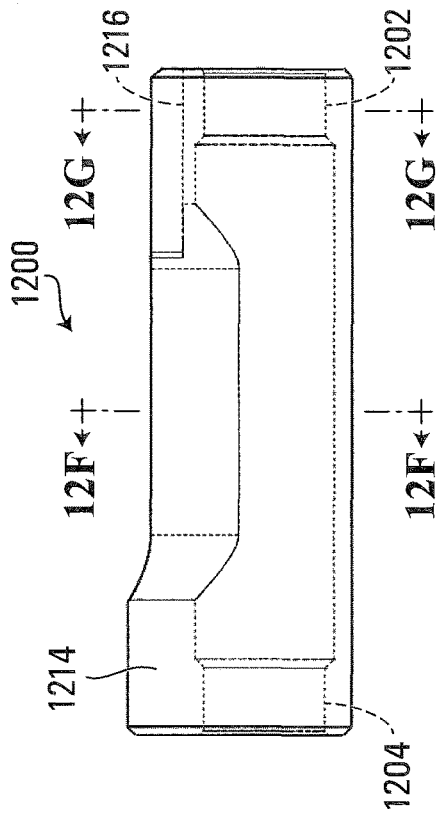
FIG. 12B is a side view of the example weighted intake member of FIG. 12A.
Figure 12A:
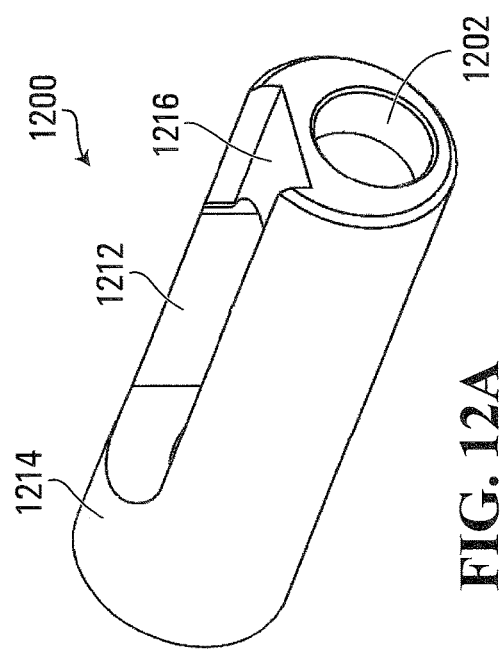
FIG. 12A is an isometric view of an example weighted intake member.
Figure 12D:
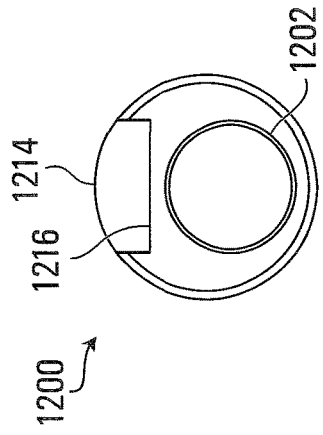
FIGS. 12C and 12D are opposite end views of the example weighted intake member of FIG. 12A.
Figure 12C:
Figure 12G:
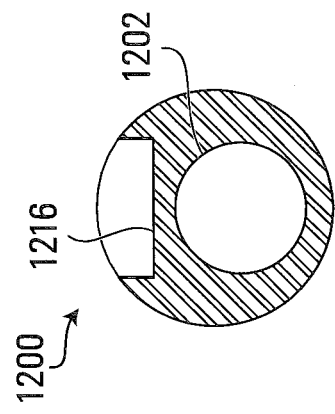
FIG. 12G is a cross-section view of the example weighted intake member of FIG. 12A, along line 12G-12G in FIG. 12B.
Figure 12F:
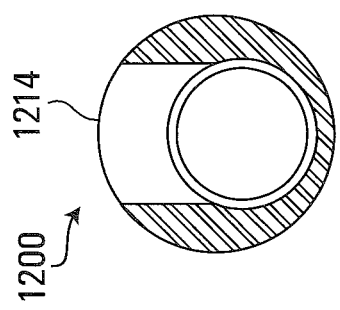
FIG. 12F is a cross-section view of the example weighted intake member of FIG. 12A, along line 12F-12F in FIG. 12B.
Figure 12E:
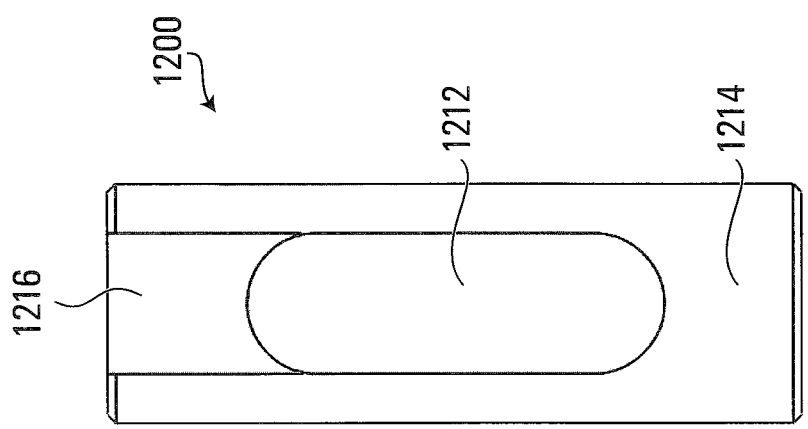
FIG. 12E is a top view of the example weighted intake member of FIG. 12A.

The sub 806 has a chamber 830 in which the second end 204 of the flow tube 200 is received and sealed from the interior of the gas separator body. One or more seals (not shown) could also or instead be provided. The sub 806 is in fluid communication with the interior of the gas separator body, through channels 832. FIG. 9, which is a cross-section view of the example gas separator of FIG. 8 along line 9-9 in FIG. 8, illustrates an example of how multiple channels 832 could be arranged around the flow tube 200 to provide for fluid communication between the separation chamber inside the gas separator body and a collection chamber 860. As noted above with reference to FIGS. 6A, 6B, and 7, other arrangements of one or more channels, which could be of similar shapes and/or spacings or different shapes and/or spacings than shown, are also possible.

In the example gas separator 800 in FIG. 8, the sump includes a housing 850 partially defining the collection chamber 860. The sump housing 850 could be made from the same material and in the same cross-sectional shape as the gas separator body housing 102, or from different material and/or in a different shape. In some embodiments, the sump housing 850 is made out of production tubing.

The sump housing 850 has interior threads at both ends in the example shown, and 862, 864 denote where the threads inside the sump housing end in the embodiment shown. The sub 806 and a plug 870 in this example have exterior threads for coupling to the sump housing 850.

The channels 832 in the sub 806 provide a path for particulates to exit the separation chamber and settle into the collection chamber 860. The shape and size of the sump housing 850 and the locations of the ends of the sub 806 and the plug 870 establish the volume of the collection chamber 860 and accordingly the volume of material that can be held in the sump.

A first end of the sump, specifically a first end of the sump housing 850, is coupled to the gas separator body by the sub 806. The plug 870 at a second end of the sump seals an interior of the sump from an exterior of the sump. The plug 870 could be substantially the same as the plug 106 as shown in FIG. 2 for example, with a chamber 872. In an embodiment, the plug 870 is the plug 106 that has been moved to the end of the sump housing 850. The chamber 872 could provide additional volume to accommodate particulates.

The sump housing 850 could be coupled to the sub 806 and the plug 870 by threaded connections and one or more set screws 852, 854 as shown, or other type(s) of connection.

During use of the example gas separator 800, on a pump down-stroke, liquid in the separation chamber is at rest, providing time for free gas that is carried by the liquid to separate out in the separation chamber. Particulates such as sand may also settle toward the bottom of the separation chamber. The sub 806 in the example gas separator 800 allows sand and/or other settled particulates to exit the gas separator into the sump collection chamber 860.

The size of the collection chamber 860 could be determined, for example, based on the amount of particulates expected to settle from wellbore liquids and the desired operating time before the collection chamber 860 would fill with settled particulates. When the collection chamber 860 is full or is expected to need cleaning, the production tubing string could be retracted from the well, so that the sump can be cleaned at the well surface. It may be desirable to have periodic sump cleaning cycles coincide with changes of the downhole pump. The content of solids/particulates in produced liquids could be periodically measured at the surface, to determine whether the collection chamber 860 is full and needs cleaning. Such measuring at the surface could be especially useful in applications where the production of solids fluctuates, and calculations of sump size are not reliable.

The example gas separators 100, 500, 800 provide different options for handling settled particulates. In the example gas separators 100, 800, settled particulates collect in the separation chamber or in a collection chamber, and in the example gas separator 500 particulates are dumped from the gas separator.

FIG. 10 is a cross-section view of yet another example gas separator 1000, in which particulates can accumulate and be dumped. Like the example gas separator 800, the example gas separator 1000 includes a sump with a sump housing 850 partially defining a collection chamber 1060. Instead of the plug 870 as shown in FIG. 8, however, the second end of the sump has a check valve coupled to it.

In the example shown, the check valve is a multi-part valve. A sub 1010 includes a valve seat for a ball 1012 of the check valve. A valve outlet 1020 is coupled to the sub 1010, and includes a ball holder 1014 to hold the ball 1012 when the valve is open. FIG. 11 is a cross-section view of part of the example gas separator 1000 of FIG. 10 with the check valve in an open position and the ball 1012 resting on the ball holder 1014. The passage 1016 would be open to the production well in this example during use of the example gas separator 1000.

The check valve sub 1010 and outlet 1020 could be made from the same material as the sub 104 and/or the sub 806, or a different material. It is expected that the check valve sub 1010 and outlet 1020 would be made from metal in many embodiments. The check valve ball 1012 could be made from the same material or a different material. Although not shown in FIGS. 10 and 11, a seal, coating, or other component could be provided on at least part of the sub 1010 to aid in seating the ball 1012 when the check valve is closed.

The check valve sub 1010 could be coupled to the sump housing 850 and to the check valve outlet 1020 by threaded connections and one or more set screws 852, 1022 as shown, or other type(s) of connection.

Operation of the example gas separator 1000 is substantially similar to operation of the example gas separator 800. On a pump down-stroke, liquid in the separation chamber is at rest, and free gas that is carried by liquids has some time to separate out in the separation chamber. Particulates such as sand may settle toward the bottom of the separation chamber, and the sub 806 allows sand and/or other settled particulates to exit the gas separator into the sump collection chamber 1060. The sump with an attached check valve as in FIGS. 10 and 11 allows collected particulates to flow out of the sump through the check valve and be dumped into the well. During a down-stroke of the pump, the check valve ball 1012 can be unseated and particulates can flow through the sub 1010 and the outlet 1020. An upstroke of the pump draws the check valve ball 1012 toward its seat on the sub 1010 to seal the sump and allow the pump to draw liquids from the separation chamber and into the flow tube 200. Settled particulates may thus initially collect in the sump but also be dumped into the well through the check valve. The check valve could potentially open on each pump down-stroke, or on down-strokes during which a weight of material collected in the sump chamber 1060 are of sufficient weight to unseat the check valve ball 1012.

Although a check valve is shown in combination with a sump in FIG. 10, a check valve could be used without a sump. In such an embodiment, the check valve ball 1012 is drawn toward its seat on the sub 1010 during a pump upstroke, and can be unseated on a pump downstroke to allow settled particulates to pass into the check valve outlet 1020.

FIGS. 1 to 11 illustrate different embodiments of a gas separator, with different gas separator body members at their downhole ends. The embodiment in FIGS. 1 to 4 has a plug 106 as the downhole body member, the embodiment in FIGS. 5 to 7 has a sub 506 as the downhole body member and one or more tubing sections could be coupled to the sub 506, the embodiments in FIGS. 8 to 11 have a sump as the downhole body member, and the embodiment in FIGS. 10 and 11 also has a check valve.

These embodiments also include a weighted intake member 210. FIGS. 12A to 12G show views of an example weighted intake member, including an isometric view, a side view, opposite end views, a top view, a cross-section view along line 12F-12F in FIG. 12B, and a cross-section view along line 12G-12G in FIG. 12B, respectively.

It is expected that the example weighted intake member 1200 would be made from metal in many embodiments, although other materials could also or instead be used.

The example weighted intake member 1200 has a bore 1202, 1204 at each end, to allow the weighted intake member 1200 to be mounted onto a flow tube. The bores could be formed, for example, in a single drilling operation by drilling through the entire length of a blank of material. There could instead be separate drilling operations and/or other machining operations to form the bores 1202, 1204. The bores 1202, 1204 could be formed in other ways, such as in embodiments in which the weighted intake member is cast or extruded and the bores can be formed during casting or extrusion.

The intake port 1212 could similarly be formed by milling or some other form of machining, or in a mould where the example weighted intake member 1200 is formed by casting. In the embodiment shown, a channel or notch 1216 is formed at one end of the example weighted intake member. The notched end would be oriented toward the pump end of a gas separator, to facilitate movement of fluid around the end of the weighted intake member 1200 and into a flow tube through the intake 1212.

Reference number 1214 designates a weight. This weight 1214 could be a separate component that is integrated into or otherwise carried by the example intake member 1200, or be in the form of extra material near the intake port 1212 relative to other parts of the intake member. As shown perhaps most clearly in FIGS. 12C and 12D, the bores 1202, 1204 are eccentric, and are not centred in the example weighted intake member 1200. This in itself could contribute to a weight distribution in which the example weighted intake member 1200 is heavier on an intake side where the intake port 1212 is located than on an opposite side. A weighted intake member could also or instead have a greater diameter at an end that is to be oriented away from the pump, so that an eccentric bore as shown at 1204 would result in a greater thickness of material and a greater weight at a lower intake side of the weighted intake member than elsewhere in the weighted intake member.

Regardless of how this type of weight distribution is actually achieved, the weight distribution has the effect of causing the example weighted intake member 1200 to be oriented with the intake port 1212 toward a bottom of a separation chamber in a gas separator as disclosed herein.

Thus, the example weighted intake member 1200 has the following features formed in it: an intake member body with aligned end bores 1202, 1204 to receive a flow tube for a gas separator, an intake member interior chamber inside the intake member body, and an intake port 1212 opening into the intake member interior chamber. The example weighted intake member 1200 also include a weight 1214, carried by the body, near the intake port 1212.

Embodiments could include additional components that are not explicitly shown in FIGS. 1 to 12G. In a production well completion system, for example, a gas separator as disclosed herein could be used in conjunction with a tubing string that is coupled to surface equipment, and downhole equipment coupled to the tubing string. The downhole equipment could include a pump coupled to the gas separator.

Figure 13:
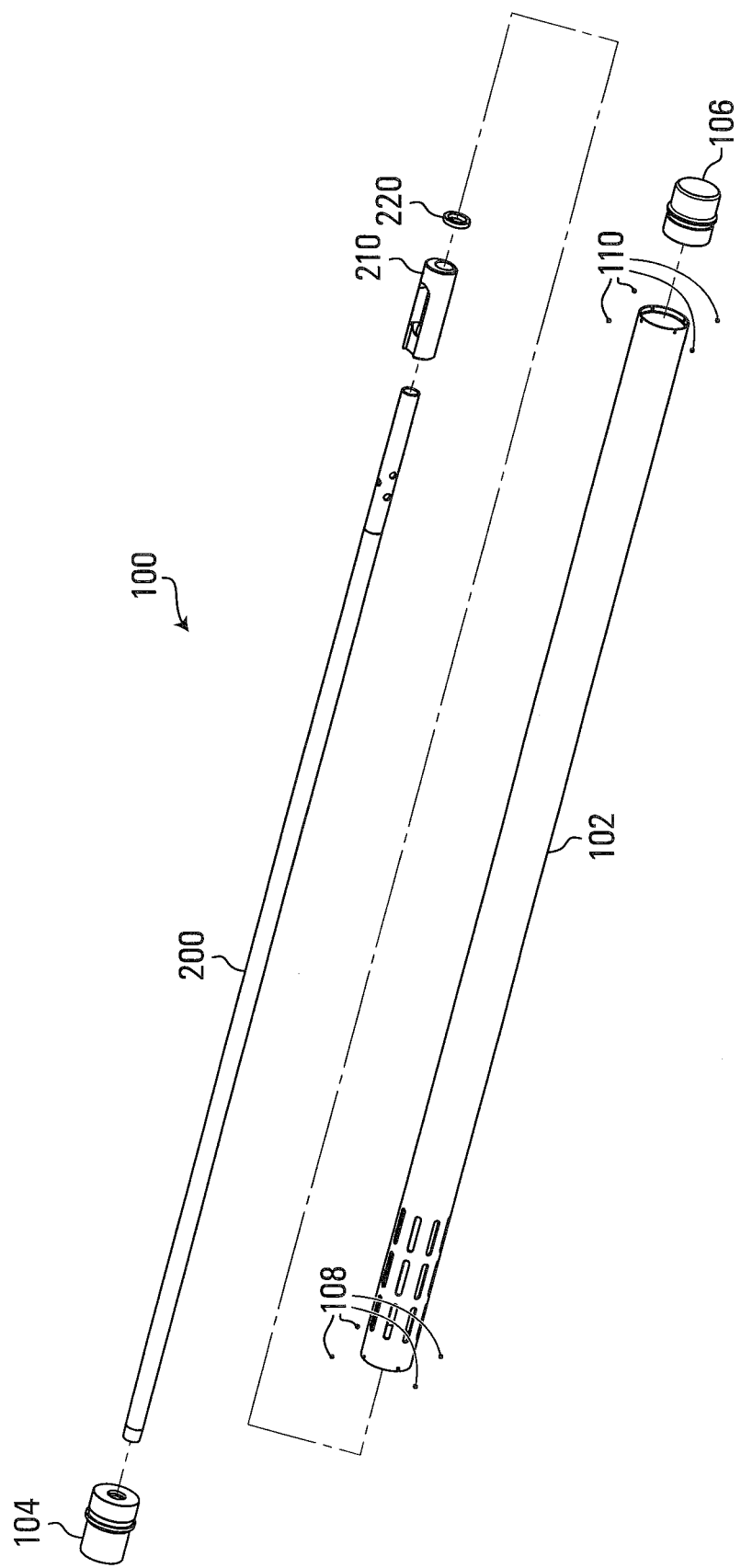
FIG. 13 is an exploded view of the example gas separator of FIG. 1.

FIGS. 1 to 12G relate to examples of gas separators and a weighted intake member that could be used therein. Related methods are also contemplated. Such methods could include methods of assembling a gas separator. FIG. 13 is an exploded view of the example gas separator of FIG. 1, and could be useful in understanding the flow diagram in FIG. 14, which illustrates an example method.

With reference to method operations in the example method 1400 in FIG. 14 and the parts labelled in FIG. 13, a method of assembling a gas separator could include an operation 1402 of inserting a first end of a flow tube 200 for a gas separator 100 into a sub 104. This could involve, for example, threading the flow tube 200 into the sub 104.

As shown at 1404, the example method 1400 also includes sliding a weighted intake member 210 onto the flow tube 200, to rotatably mount the weighted intake member to the flow tube. A washer 220 could also be slid onto the flow tube 200. The weighted intake member 210 defines an intake member interior chamber sealed against the flow tube 200 and an intake port opening into the intake member interior chamber, and includes a weight proximate the intake port. The flow tube 200 has a first open end, a second open end, and a wall therebetween having an opening defined therein proximate the second end.

A gas separator housing 102 is slid over the second end of the flow tube 200 and the weighted intake member 210 and toward the sub 104, at 1406. In an embodiment, the gas separator housing is also coupled to the sub 104 at 1406, by threading the housing onto the sub for example. At 1408, the second end of the flow tube 200 is inserted into a cavity in a gas separator body member (in this case a plug 106) to seal the second end of the flow tube. The housing 102 is coupled to the sub 104 and to the gas separator body member (plug) 106 at 1410, by engaging threads on the housing 102 and the plug 106 for example. Set screws 108, 110 could be installed separately at 1406, 1410, or after 1410 to complete assembly.

The example method 1400 is intended solely for illustrative purposes. It should be appreciated that the example method 1400 and other methods are not necessarily restricted to the example gas separator 100. The example gas separators 500, 800, and/or 1000 in FIGS. 5, 8, and 10 could be assembled in a similar manner. The body member referenced in FIG. 14 could thus be a plug 106 as shown in FIG. 13, or another component such as a further sub. Other embodiments could include additional operations such as coupling a sump to the gas separator body member and possibly coupling a check valve to the sump.

The illustrated operations could also or instead be performed in a different order. Referring to FIG. 2, in the illustrated embodiment the first end 202 of the flow tube 200 is within the housing 102 and the second end 204 of the flow tube 200 protrudes beyond the lower end of the housing 102 in the view shown in the drawing. The second end 204 of the flow tube 200 might thus be accessible for insertion into the cavity 230 of the plug 106 after the housing has been slid over the flow tube toward the sub 104. This might make it easier to insert the first end 202 of the flow tube 200 into the top sub 104 before the housing 102 is slid over the flow tube, and then insert the second end 204 of the flow tube into the cavity 230 of the plug 206 as shown in FIG. 14. In another embodiment, it might be possible to insert the second end 204 of the flow tube 200 into the cavity 230 of the plug 106 first, then slide the housing 102 over the flow tube and toward the plug, and then insert the first end of the flow tube into the sub 104.

There could also or instead be different ways to perform the illustrated operations. Although 1404 refers to sliding the intake member 210 onto the flow tube 200, this is equivalent to sliding or routing the flow tube through the intake member end bores. Inserting the flow tube first end into the sub at 1402 could similarly be viewed as installing the top sub onto the flow tube first end. It could be the flow tube 200, carrying the weighted intake member 210 and the sub 104, that is slid into the housing 102 rather than sliding the housing over the flow tube and toward the sub at 1406. At 1408, installing the gas separator body member (plug) 106 onto the flow tube second end could be equivalent to inserting the flow tube second end into a cavity of the body member. Finally, although 1406, 1410 refer to coupling the gas separator housing 102 to the sub 104 and the body member (plug) 106, this would be equivalent to coupling the sub to the housing and coupling the plug to the housing. Any combination of these operations result in the housing 102, the sub 104, and the plug 106 being coupled together.

Another method could involve fewer or different operations than shown. For example, a gas separator might include a sump, without a weighted intake member. In one such embodiment, the first end of the flow tube is inserted into a sub at 1402, a gas separator housing is slid over the second end of the flow tube and toward the sub and coupled to the sub at 1406, the second end of the flow tube is inserted into a cavity in a gas separator body member at 1408 to seal the second end of the flow tube, and the housing is coupled to the gas separator body member at 1410. There is no operation 1404 involving an intake member, but there is an additional operation (not shown in FIG. 14) of coupling a sump to the gas separator body member in an embodiment that includes a sump but no intake member.

In the context of a gas separator that includes a sump, a method of operation could include such steps as those shown in the flow chart of FIG. 15, which illustrates an example method 1500. At 1502, a tubing string with attached downhole equipment is run into a production well. The downhole equipment includes at least a pump and a gas separator coupled to the pump. The gas separator includes a sump to collect particulates that settle out of wellbore fluid in a chamber of the gas separator. When the downhole equipment reaches a desired location in the production well and an anchor is set, for example, the pump is operated at 1504 to draw the wellbore fluid through the gas separator and pump the wellbore fluid into the tubing string. Operation of the pump is ceased at 1506, when it is expected that the sump needs cleaning for instance. The tubing string and the downhole equipment are retracted to a surface of the production well at 1508. Collected particulates are cleaned from the sump at 1510, and the tubing string may then be run back into the production well at 1502.

As noted above for the example method 1400 in FIG. 14, the example method 1500 is also intended for the purposes of illustration, and variations are possible.

What has been described is merely illustrative of the application of principles of embodiments of the present disclosure. Other arrangements and methods can be implemented by those skilled in the art.

For example, other embodiments might include a sump or a sump in combination with a check valve, without a weighted intake member. Such a gas separator could include a plug or a check valve coupled to the sump, as in FIGS. 8 and 10, respectively.

I claim:
1. A gas separator comprising:
a gas separator body having a first end to couple the gas separator to a pump in a production well, a second end, a wall between the first end and the second end, and an opening proximate the first end to allow passage of fluid between the production well and an interior of the gas separator body;

a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with an interior of the flow tube;

a weighted intake member sealed against and rotatably mounted on the flow tube to enable the weighted intake member to be rotated around the flow tube, the weighted intake member defining an intake port in fluid communication with the interior of the gas separator body and the flow tube opening, the weighted intake member comprising a weight proximate the intake port.

2. The gas separator of claim 1, the gas separator body comprising:

a sub at the first end of the gas separator body to couple the gas separator to the pump;

a housing having a first end coupled to the sub, a second end, and a wall between the first end of the housing and the second end of the housing, the wall of the housing having the opening formed therein to allow fluid passage between the production well and the interior of the gas separator body;

a body member at the second end of the gas separator body, coupled to the second end of the housing.

3. The gas separator of claim 1, the gas separator body comprising a plug at the second end of the gas separator body, the plug comprising a chamber in which the second end of the flow tube is received and sealed from the interior of the gas separator body.

4. The gas separator of claim 1, the gas separator body comprising a sub, at the second end of the gas separator body, in fluid communication with the interior and the exterior of the gas separator body, the sub comprising a chamber in which the second end of the flow tube is received and sealed from the interior of the gas separator body.

5. The gas separator of claim 1, further comprising:

a sump having a first end to be coupled to the gas separator body, and a second end;

a plug at the second end of the sump, the gas separator body comprising a sub, at the second end of the gas separator body and in fluid communication with the interior of the gas separator body, coupling the first end of the sump to the gas separator body, the sub comprising a chamber in which the second end of the flow tube is received and sealed from the interior of the gas separator body.

6. The gas separator of claim 1, the gas separator body comprising a sub, at the second end of the gas separator body and in fluid communication with the interior of the gas separator body, the sub comprising a chamber to receive and seal the second end of the flow tube from the interior of the gas separator body, the gas separator further comprising:

a sump having a first end coupled to the gas separator body by the sub, and a second end, a check valve, coupled to the second end of the sump.

7. The gas separator of claim 1, the weighted intake member being further slidably mounted on the flow tube to enable the weighted intake member to be moved along the flow tube.

8. The gas separator of claim 1, the weight of the weighted intake member comprising an increased thickness of material comprising the weighted intake member in an area of the weighted intake member proximate the intake port, relative to a material thickness of a different area of the weighted intake member.

9. The gas separator of claim 1, implemented in a production well completion system, the production well completion system further comprising:

a tubing string coupled to surface equipment;

downhole equipment coupled to the tubing string, the downhole equipment comprising a pump coupled to the gas separator at the first end of the gas separator body.

10. The gas separator of claim 1, the weighted intake member comprising:

an intake member body having formed therein:
aligned end bores to receive the flow tube;
an intake member interior chamber;
the intake port opening into the intake member interior chamber.

11. A method of assembling a gas separator comprising: a gas separator body having a first end to couple the gas separator to a pump in a production well, a second end, a wall between the first end and the second end, and an opening proximate the first end to allow passage of fluid between the production well and an interior of the gas separator body; a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with an interior of the flow tube; and a weighted intake member sealed against and rotatably mounted on the flow tube to enable the weighted intake member to be rotated around the flow tube, the weighted intake member defining an intake port in fluid communication with the interior of the gas separator body and the flow tube opening, the weighted intake member comprising a weight proximate the intake port, the method comprising:

inserting the first end of the flow tube into a sub of the gas separator body;

sliding the weighted intake member onto the flow tube to rotatably mount the weighted intake member to the flow tube;

sliding a gas separator housing of the gas separator body over the second end of the flow tube and the weighted intake member and toward the sub;

coupling the gas separator housing to the sub;

inserting the second end of the flow tube into a cavity in a gas separator body member of the gas separator body to seal the second end of the flow tube;

coupling the gas separator housing to the gas separator body member.

12. The method of claim 11, further comprising:
coupling a sump to the gas separator body member.

13. The method of claim 12, further comprising:
coupling a check valve to the sump.

14. The gas separator of claim 1, further comprising:
a sump coupled to the second end of the gas separator body.

15. The gas separator of claim 14,
the sump having a first end coupled to the second end of the gas separator body, and a second end,
the gas separator further comprising a plug at the second end of the sump.

16. The gas separator of claim 14,
the sump having a first end coupled to the second end of the gas separator body, and a second end,
the gas separator further comprising a check valve coupled to the second end of the sump.

17. The gas separator of claim 14,
the gas separator body comprising a sub, at the second end of the gas separator body and in fluid communication with the interior of the gas separator body, coupling the sump to the gas separator body,
the sub comprising a chamber in which the second end of the flow tube is received and sealed from the interior of the gas separator body.

18. The gas separator of claim 14, the gas separator body comprising:
a sub at the first end of the gas separator body to couple the gas separator to the pump;
a housing having a first end coupled to the sub, a second end, and a wall between the first end of the housing and the second end of the housing, the wall of the housing having the opening formed therein to allow fluid passage between the production well and the interior of the gas separator body;
a body member at the second end of the gas separator body, coupled to the second end of the housing.

19. The gas separator of claim 14, implemented in a production well completion system, the production well completion system further comprising:
a tubing string coupled to surface equipment;
downhole equipment coupled to the tubing string, the downhole equipment comprising a pump coupled to the gas separator at the first end of the gas separator body.

20. A method comprising:
running a tubing string with attached downhole equipment into a production well, the downhole equipment comprising a pump and a gas separator coupled to the pump, the gas separator comprising: a gas separator body having a first end to couple the gas separator to a pump in a production well, a second end, a wall between the first end and the second end, and an opening proximate the first end to allow passage of fluid between the production well and an interior of the gas separator body; a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with an interior of the flow tube; a weighted intake member sealed against and rotatably mounted on the flow tube to enable the weighted intake member to be rotated around the flow tube, the weighted intake member defining an intake port in fluid communication with the interior of the gas separator body and the flow tube opening, the weighted intake member comprising a weight proximate the intake port; and a sump coupled to the second end of the gas separator body to collect particulates that settle out of wellbore fluid in a chamber of the gas separator;
operating the pump to draw the wellbore fluid through the gas separator and pump the wellbore fluid into the tubing string;
ceasing operation of the pump;
retracting the tubing string and the downhole equipment to a surface of the production well;
cleaning collected particulates from the sump;
running the tubing string back into the production well.

21. A method of assembling a gas separator comprising: a gas separator body having a first end to couple the gas separator to a pump in a production well, a second end, a wall between the first end and the second end, and an opening proximate the first end to allow passage of fluid between the production well and an interior of the gas separator body; a flow tube having a first end in fluid communication with an exterior of the gas separator body through the first end of the gas separator body, and a second end sealed from the interior of the gas separator body proximate the second end of the gas separator body, the flow tube having an opening defined therein proximate the second end of the flow tube in fluid communication with an interior of the flow tube; a weighted intake member sealed against and rotatably mounted on the flow tube to enable the weighted intake member to be rotated around the flow tube, the weighted intake member defining an intake port in fluid communication with the interior of the gas separator body and the flow tube opening, the weighted intake member comprising a weight proximate the intake port; and a sump coupled to the second end of the gas separator body, the method comprising:
inserting the first end of the flow tube into a sub of the gas separator body;
sliding the weighted intake member onto the flow tube to rotatably mount the weighted intake member to the flow tube;
sliding a gas separator housing of the gas separator body over the second end of the flow tube and the weighted intake member and toward the sub;
coupling the gas separator housing to the sub;
inserting the second end of the flow tube into a cavity in a gas separator body member of the gas separator body to seal the second end of the flow tube;
coupling the gas separator housing to the gas separator body member;
coupling the sump to the gas separator body member.

22. The method of claim 21, further comprising:
coupling a check valve to the sump.

* * * * *